Patented Feb. 19, 1929.

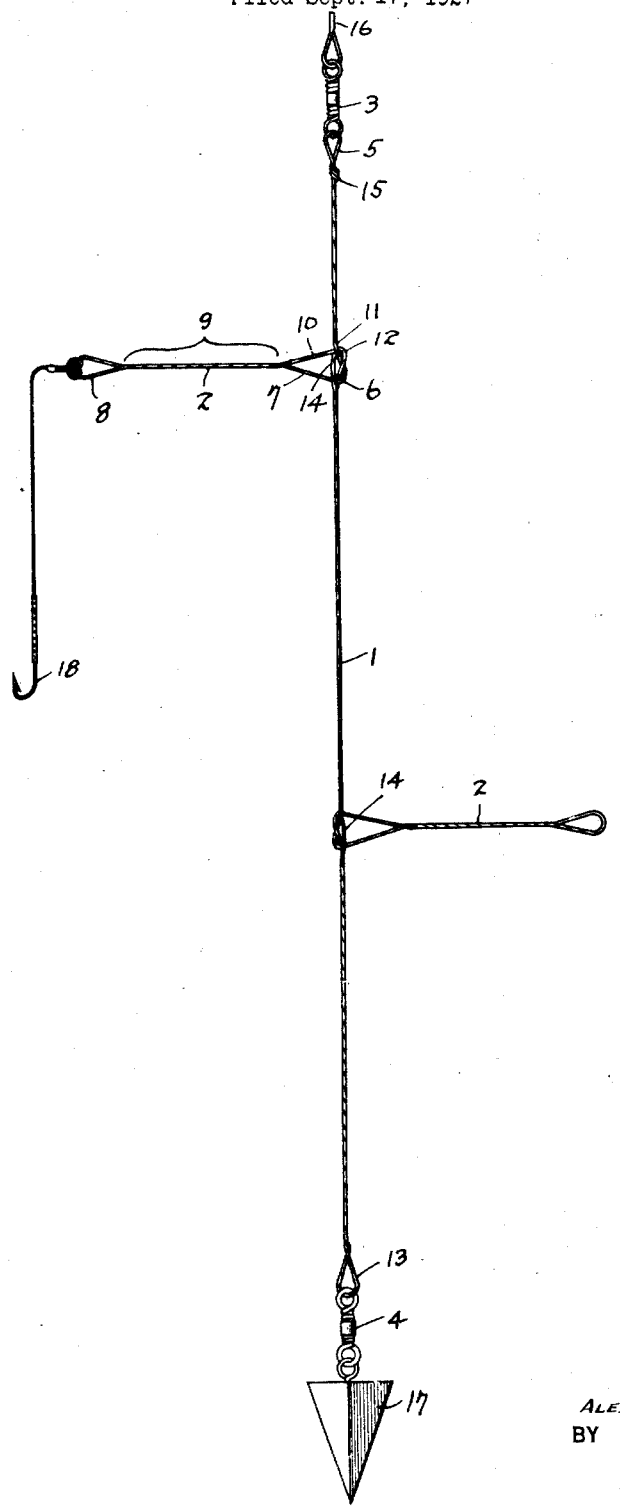

1,702,417

UNITED STATES PATENT OFFICE.

ALEXANDER T. SANDBO, OF SAN FRANCISCO, CALIFORNIA.

FISHING TACKLE.

Application filed September 17, 1927. Serial No. 220,181.

My invention relates to improvements in fishing tackle, and it consists in the combinations, constructions and arrangements hereinafter described and claimed.

An object of my invention is to provide a fishing tackle constructed of a plurality of strands of wire wrapped around each other and fashioned in such a manner as to provide arms that project at right angles from the main line. The wire is preferably piano wire and has spring qualities. The wrapping and the bending of the wire adjacent to the main line holds the branch lines at an angle with respect to the main line and braces these branch lines so that there will be no tendency of the branch lines to break at the point of juncture when tension is applied at the free ends thereof.

A further object of my invention is to provide a device of the type described in which the branch lines will not become tangled up with the main line, as is the case where branch lines are formed of gut instead of wire. Furthermore, due to the resiliency of the wire the branch lines are constantly vibrating and therefore move the hooks carried thereby and attract the fish.

Other objects and advantages will appear in the following specification, and the novel features of my invention will be particularly pointed out in the appended claims.

My invention is illustrated in the accompanying drawing, forming a part of this application, in which the figure illustrates the entire device.

The device consists of a main line 1 and a plurality of branch lines 2. The main line 1 and the branch lines 2 may be made of one or more strands of wire, depending upon the size of the fish desired to be caught. In the drawing I have shown what is known as a four-strand fishing tackle. The four strands are made up of two long wires that extend from a coupling 3 down to a second coupling 4, and then back up to the first coupling, the wires being long enough to also form the branches 2 in a manner now to be described.

Starting with the coupling 3, I first make a loop 5 with the two long wires. A bend 6 is made in the two wires, this bend being such as to form one side 7 of an isosceles triangle. The double wire is then formed into a loop 8 that may be positioned any desired distance from the main line 1. The two strands are wrapped around the outwardly projecting two strands for forming the four-strand portion extending between the ends of a bracket 9. The two strands are then bent for forming the side 10 of the isosceles triangle, and then the strands are looped around the main line at the point 11, and are passed through the angle at 6. The result is a kind of a basket weaving which forms an angle 6 and an angle 12, separated from each other and bearing against the main line 1 for acting as a brace for the arm 2. This bracing action permits a flexing of the arm 2, but prevents the arm from pivoting at a juncture between the arm and the main line. The two strands of wire are now continued down to the next arm 2, and the exact same winding and bending is accomplished at this point as already set forth in the description of the first arm.

It is obvious that as many arms as desired may be formed. The strands are now extended downwardly and are formed into a loop 13 that supports the coupling 4. The strands are then wound back on themselves for forming a four-strand main line. At the juncture of the arms 2 with the main line the return portions 14 of the two strands are threaded through the triangles and act as braces for preventing bending of the arms with respect to the main line. The two returning strands are then passed through the coupling 3 and are wrapped around the main line as at 15, which forms a terminus for the strands.

I have shown the present fishing tackle as being secured to a line 16, and as being weighted by a member 17 that is secured to the coupling 4. This type of weight is used for holding the main line 1 in a vertical position in the water when still-water fishing is done. The weight 17 may be dispensed with when the line is moved through the water as, for example, when fishing for trout, etc. Each arm 2 supports one or more hooks 18.

Fishermen experience great difficulty in keeping their lines from becoming tangled. The various hooks carried by the main line become wrapped around the main line, and this causes the bait to become tangled, and thus prevent the fish from biting. With the present device it is impossible for the hook 18 to become permanently twisted in the main line 1. In fact, if the hook were wound around the main line 1 the arm 2 would be placed under tension and the slight jiggling of the main line would cause the arm to free the hook. It will therefore be seen that it is impossible for the device to become tangled. One of the outstanding features of the invention is the fact that the device compels moving of the bait, so that the bait appears to be alive. In this way the fish are attracted far more readily than where the bait stands still. Even in a relatively still body of water, slight currents will cause the arms to vibrate and these, in turn, will keep the hooks 18 moving. This is more readily noticed when the device is moved through the water, which may either be standing still or in movement itself, such as a stream. Where any movement is imparted to the device or to the water the hooks will be kept in constant agitation. This affords the necessary attraction for causing the fish to bite.

Although I have shown and described one embodiment of my invention, it is to be understood that the same is susceptible of various changes and I reserve the right to employ such changes as may come within the scope of the appended claims.

I claim:

1. A fishing tackle formed from a plurality of strands of wire, these strands being fashioned into a main line and arms extending from the main line, said strands being bent at the juncture of the arms with the main line for forming triangles, the bases of the triangles bearing against the main line for preventing pivotal movement between the arms and the line.

2. A fishing tackle comprising a plurality of resilient strands forming a main line and arms, said strands being bent for forming triangles at the juncture of the arms with the main line, whereby the sides of the triangles will prevent a pivoting of the arms with respect to the main line, said strands being fashioned into loops at the free ends of the arms.

3. A fishing tackle comprising a main line composed of a plurality of strands, certain of the strands forming arms to extend at an angle to the main line, the strands forming such arms being then bent back to the main line and forming a part thereof, whereby the arms form an integral part with the main line.

4. A fishing tackle comprising a main line constructed of one or more strands, certain of the strands having portions thereof bent to form arms, whereby the arms form an integral part with the main line, each arm having a triangularly-shaped portion disposed adjacent to the main line, the base of which bears against the main line for preventing pivoting of the arm at the point of connection with the main line, the free ends of said arms being fashioned into loops and fish hooks connected to said loops by leaders.

ALEXANDER T. SANDBO.